J. W. AYLSWORTH.
PRODUCTION OF MATRICES.
APPLICATION FILED AUG. 29, 1910.

1,144,338. Patented June 22, 1915.

Witnesses:
Robert M. Sutphen
Delos Holden

Inventor:
Jonas W. Aylsworth

UNITED STATES PATENT OFFICE.

JONAS W. AYLSWORTH, OF EAST ORANGE, NEW JERSEY, ASSIGNOR, BY DIRECT AND MESNE ASSIGNMENTS, TO CONDENSITE COMPANY OF AMERICA, OF EAST ORANGE, NEW JERSEY, A CORPORATION OF NEW JERSEY.

PRODUCTION OF MATRICES.

1,144,338.

Specification of Letters Patent.

Patented June 22, 1915.

Application filed August 29, 1910. Serial No. 579,585.

*To all whom it may concern:*

Be it known that I, JONAS W. AYLSWORTH, a citizen of the United States, and a resident of East Orange, in the county of Essex and State of New Jersey, have invented certain new and useful Improvements in the Production of Matrices, of which the following is a description.

The invention has for its object the production of a novel matrix for stereotyping processes, said matrix having properties which adapt it to be used for the production of a large number of duplicate printing or embossing working plates which may be used for printing or embossing either the coarsest letters or designs or the finest photo-engravings, phonographic impressions, or designs.

The invention comprises the making of the said novel matrix as a reversed facsimile of an intaglio or relief plate which may be a photo-engraving, photo-electrotype, half-tone, or other well known plate, or a block of set type, phonograph record master or matrix, or other article to be reproduced.

In order that the invention may be more clearly understood, reference is hereby made to the accompanying drawings of which—

Figure 1:
Figure 2:
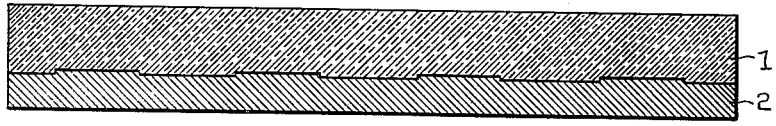
Figure 3:
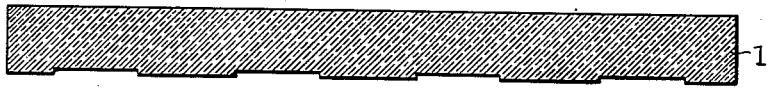

Figure 1 is a transverse section of an intaglio or relief plate such as a photo-engraving, photo-electrotype, half-tone, etc.; Fig. 2 is a similar view showing such plate pressed against a slab of material as herein described to form the improved matrix; Fig. 3 is a similar view of the martix after the plate has been removed therefrom.

In practising the invention I form the matrix 1 by pressing a plastic phenolic condensation product, or by casting a fusible phenolic condensation product, capable of being hardened to the infusible or non-plastic state, against the plate 2, block of type, phonograph record master or matrix, or other object to be copied, and harden the same while in contact with the plate by the application of a sufficient degree of heat to cause the hardening to take place. The product which I prefer to employ for this purpose is fully described in my Patent No. 1,020,593, dated March 19, 1912, and comprises a mixture of a fusible phenol resin with which has been incorporated from 7.6 per cent. to 12 per cent. of its weight of hexa-methylene-tetra-amin, these ingredients having been mixed together at a temperature of 220° F. or lower. These ingredients will not react when mixed together at such a temperature but upon subsequent heating to a sufficient temperature and for a sufficient time will react to form the desired infusible insoluble hard condensation product, as is fully described in said application. Or, in place of the above, the composition described in my Patent No. 1,102,630, issued July 7, 1914, may be used, in which composition the hexa-methylene-tetra-amin of the composition just described is replaced by a solid anhydrous polymerized formaldehyde, such as di-oxymethylene, in a proper proportion, from 5 to 10 per cent. of the weight of the phenol resin. In either case the final infusible product is caused by the combination of the methylene radical $CH_2$ of either the hexa-methylene-tetra-amin or the polymerized formaldehyde with the phenol resin, which latter substance is a fusible phenol-methylene condensation product. In these compositions the solid solvent elements described in the above mentioned applications should not be included. The product described may be used alone or mixed with a suitable inert powdered or fibrous filling or reinforcing agent, such as wood pulp, asbestos, etc., in the proportion of 10 to 50 per cent. of the filling or reinforcing agent to 100 per cent. of the fusible phenol resin. I might also use a composition of the nature disclosed in my Patents No. 1,098,603, issued June 2, 1914, and No. 1,102,631, issued July 7, 1914. I find a special advantage in the use of asbestos as the filling material, in preference to the other filling materials described above. A matrix made with asbestos as the filler, as described, withstands compression particularly well, and it also has less contraction on cooling than matrices formed of the same or similar compositions with other fillers or with no filler. This small contraction, due to the small coefficient of expansion of the material with asbestos filler, facilitates the removal from the mold of printing plates formed therein of materials having a greater coefficient of expansion, such as plates of the condensation products referred to herein.

The product in its plastic state, preferably in the form of a slab or a sheet of required dimensions and constituting the raw material is warmed and pressed upon or against the plate 2 of which the matrix is to be a reversed fac-simile, and the material and plate are subjected to a sufficient temperature such as one of 250° Fahrenheit or higher, until the material changes to its final hard, infusible, insoluble non-plastic state. The material and plate are then cooled and separated from each other. This operation results in a matrix 1 from which any number of working plates may be formed by either pressing plastic substances thereon or by casting a suitable alloy metal or other fusible substance thereon.

When exceedingly rapid work is desired, as in newspaper printing, the following modification of the above process may be practised with almost equally good results: Sheets or slabs of the required dimensions are formed of a final infusible phenolic condensation product, such as described in my Patents No. 1,020,593 and 1,102,630, referred to, having incorporated therewith one of the final product solvent elements described in the said patents, which constitutes an agent which will cause the composition to become sufficiently plastic when reheated to a temperature of from 300° to 350° F. to readily take the desired impression, while at the same time the composition remains infusible and insoluble. The solid solvent element or plasticity agent referred to may be a nitro or chloro derivative of naphthalene, benzoic acid or anhydrid or other agents described in my applications referred to. The matrix 1 is formed from these sheets or slabs by pressing while heated to 300° F. or higher and cooling in contact with the original intaglio or relief plate 2, or block of type, or other object to be reproduced.

While I have stated that it is possible to use a composition in which hexa-methylene-tetra-amin is replaced by a solid anhydrous polymerized formaldehyde, such as dioxymethylene, as the methylene-containing hardening agent, with fair results, it should be clearly understood that the composition described in my Patent No. 1,020,593 referred to, in which hexa-methylene-tetra-amin is combined with fusible phenol resin to harden the same, is very superior thereto in practical work. The superiority of the composition made with hexa-methylene-tetra-amin over other forms of hardened infusible condensation products consists in the fact that it does not stick to the plate 2 or object to be copied, after it has been hardened in contact therewith and cooled, whereas with the other compositions there is a considerable tendency thus to stick. Further, with the hexa-methylene-tetra-amin composition the hardening reaction takes place at comparatively low temperatures in a much shorter time than with the other compositions, because of which its use is much more practical for the making of molds.

So far as I am aware, no organic or hot-plastic substance has been proposed prior to my present invention, for use as a matrix, which will not become plastic and entirely too soft and yielding, when heated, in use, to be successfully used as a heated matrix. Substances such as lead, hard rubber, celluloid, papier-mâché, gelatin and other known substances which are or become sufficiently plastic when heated to permit pressing the same into contact with a positive to form a negative replica thereof, are all impracticable for use as matrices in which to mold materials which themselves require the use of heat and pressure in molding, such as plastic phenolic condensation products. The phenolic condensation product particularly described by me, when formed into a matrix, can be used successfully for molding objects therein at temperatures exceeding 230° F., without being at all deformed, whereas lead, rubber and the other substances referred to above soften at such temperature and are rendered worthless for subsequent use as a matrix. As an example of the capability of my improved matrix in regard to heat-resistance, it may be stated that lead and even soft copper and aluminium when heated can be pressed into the same and shaped as desired with excellent results and without marring the surface of the mold. This result would be impossible with molds formed of the substances referred to above, and satisfactory results would be impossible even with molds formed of some phenolic condensation products, when molding therewith at temperatures exceeding 230° F. The unexpectedly superior results from the use of the material described by me in the formation of matrices was, and could only be, demonstrated by experiment.

It should be particularly noted that the matrix made by my invention is not at all sensitive to or deformed by changes of temperature within the range in which it is used, and that by its use the fine points of a half-tone plate or the sharp fine lines of an engraving are reproduced in accurate detail, in negative, in the mold itself, and may be transferred accurately therefrom to objects molded or pressed therein, for a great number of impressions.

It should be understood that my improved matrix is not strictly limited to a composition formed in accordance with my prior patents referred to herein, the latter being mentioned as illustrations of preferred compositions and methods of preparing the same. In general terms the matrix may be described as formed of an infusible phenolic condensation product having the properties referred to in the specification and the appended claims.

Having now described my invention, what I claim is:

1. A matrix for producing fac-similes of intaglio and relief plates, set type and the like, and composed of a hard, infusible, insoluble phenol-methylene condensation product.

2. A matrix for producing fac-similes of intaglio and relief plates, set type and the like, and composed of a hard, infusible, phenol-methylene condensation product, and asbestos.

3. A matrix for producing fac-similes of intaglio and relief plates, set type and the like, composed of a hard reaction product of a fusible phenol resin and a methylene containing hardening agent therefor.

4. A matrix for producing facsimiles of intaglio and relief plates, half-tones, set type and the like, composed of the hard infusible product formed by the combination under sufficient heat of a fusible phenol-formaldehyde condensation product with hexa-methylene-tetra-amin.

5. A matrix for stereotype or like plates comprising an infusible phenolic condensation product, said matrix capable of withstanding the action of molten type metal or similar alloy for the period necessary for its solidification, and capable of affording clear impressions thereof.

This specification signed and witnessed this 27th day of August 1910.

JONAS W. AYLSWORTH.

Witnesses:
DELOS HOLDEN,
H. H. DYKE.